Nov. 11, 1924.

H. E. BRANDT

DUSTER 1,515,336

Filed June 13, 1923  3 Sheets-Sheet 1

INVENTOR.
HENRY E. BRANDT.
BY HIS ATTORNEY.
James F. Williamson

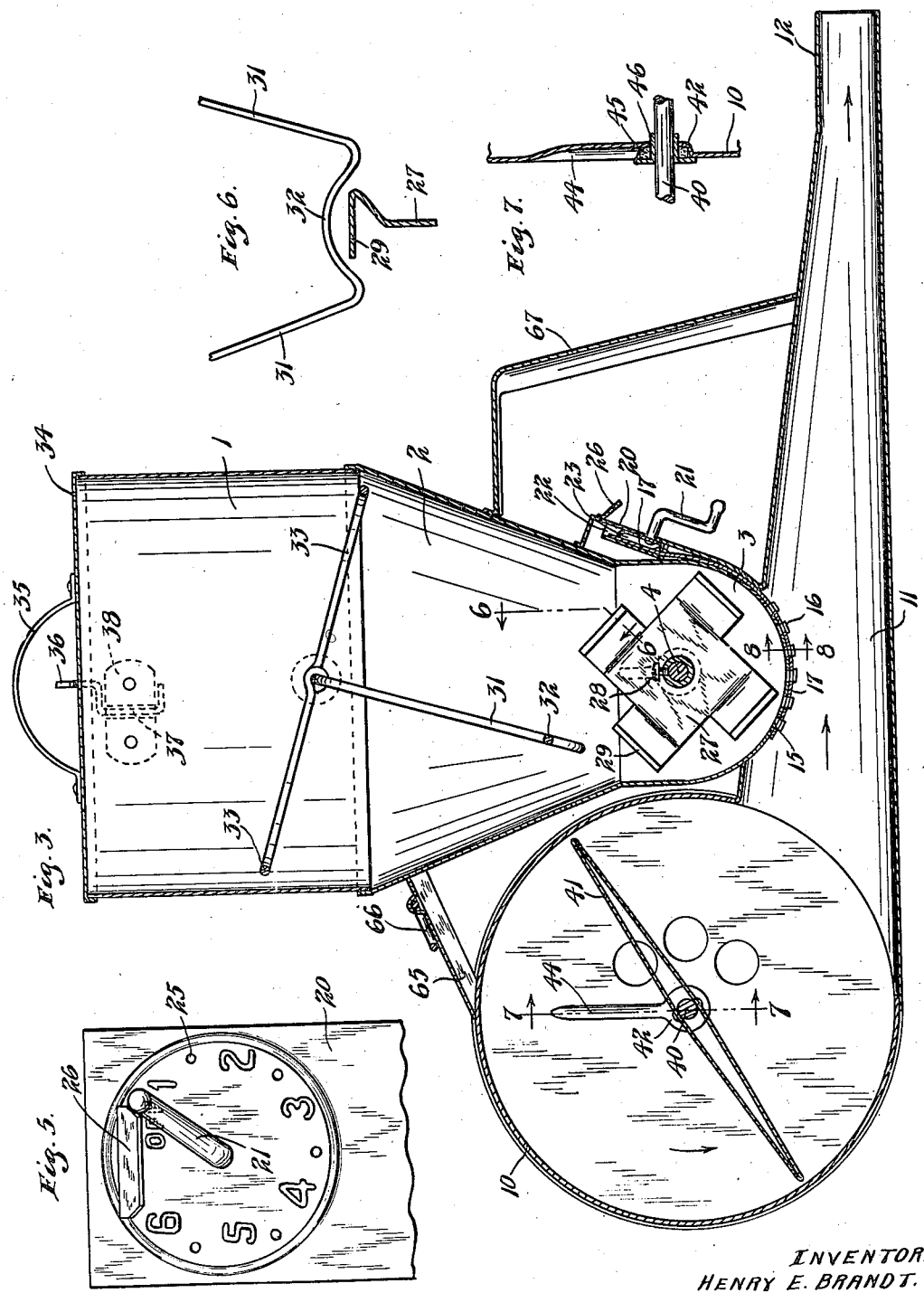

Nov. 11, 1924.  
1,515,336  
H. E. BRANDT  
DUSTER  
Filed June 13, 1923    3 Sheets-Sheet 3
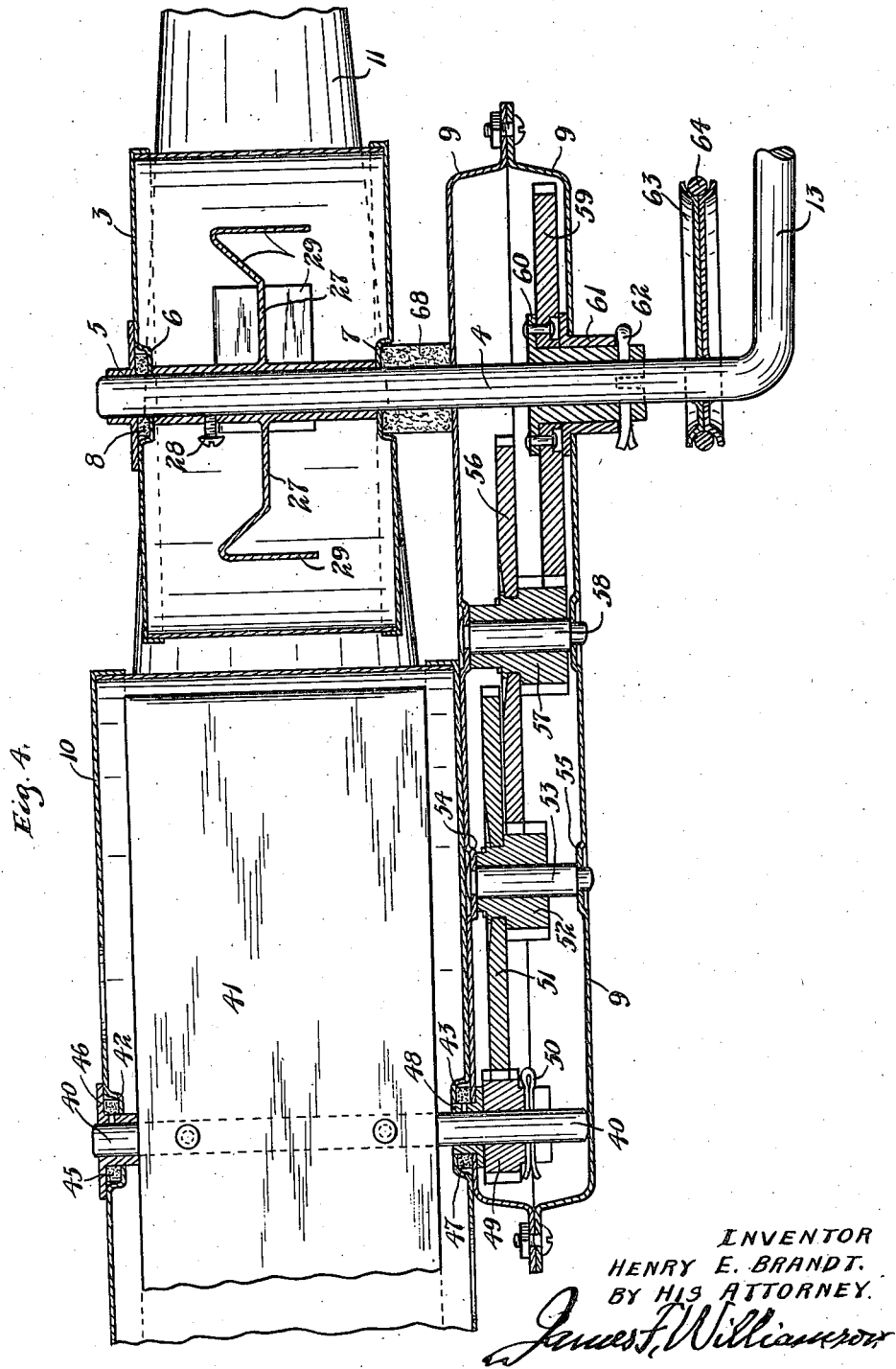
INVENTOR  
HENRY E. BRANDT.  
BY HIS ATTORNEY.

Patented Nov. 11, 1924.

1,515,336

UNITED STATES PATENT OFFICE.

HENRY E. BRANDT, OF NORTH ST. PAUL, MINNESOTA, ASSIGNOR TO THE DOBBINS MANUFACTURING COMPANY, OF NORTH ST. PAUL, MINNESOTA, A CORPORATION OF SOUTH DAKOTA.

DUSTER.

Application filed June 13, 1923. Serial No. 645,196.

*To all whom it may concern:*

Be it known that I, HENRY E. BRANDT, a citizen of the United States, residing at North St. Paul, in the county of Ramsey and State of Minnesota, have invented certain new and useful Improvements in Dusters; and I do hereby declare the following to be a full, clear, and exact description of the invention, such as will enable others skilled in the art to which it appertains to make and use the same.

This invention relates to a duster or, in other words, to a device adapted to blow insecticides or other materials in the form of powders onto plants and other objects so that the said powder is evenly and rapidly distributed. It is now a common practice to so distribute insecticide powders, lime and other material on trees and plants.

It is an object of this invention to provide such a duster of simple and compact form and one which can be easily carried and manipulated.

It is another object of the invention to provide such a duster having therein a novel form of agitating means for the material preferably comprising two agitators together with a single means for operating the same.

It is a further object of the invention to provide such a duster having a receptacle adapted to contain material to be distributed, which receptacle has a lower semi-cylindrical portion in which is disposed a revoluble agitator of simple, novel and efficient construction, said semi-cylindrical portion of the receptacle being provided with a series of openings in the bottom thereof and with novel means for adjusting the size of said openings.

It is still another object of the invention to provide such a duster having a casing comprising a fan casing, a revoluble fan therein, and means for driving said fan including a train of gears connected to the single operating means for the duster which also operates the agitators above described.

These and other objects and advantages of the invention will be fully set forth in the following description made in connection with the accompanying drawings in which like reference characters refer to the same parts throughout the different views, and in which Fig. 1 is a view in side elevation of the device;

Fig. 3 is a central vertical longitudinal section through the device shown on an enlarged scale;

Fig. 4 is a central horizontal section taken longitudinally through a portion of the device indicated by line 4—4 of Fig. 1, shown on an enlarged scale;

Fig. 5 is a view in front elevation of a portion of the device;

Fig. 6 is a vertical section taken substantially on the line 6—6 of Fig. 3, as indicated by the arrows;

Fig. 7 is a vertical section taken on the line 7—7 of Fig. 3, as indicated by the arrows;

Figure 11:
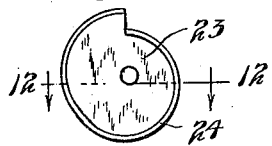
Fig. 11 is a view in side elevation of an adjusting disk used in the device.
Figure 12:
Fig. 12 is a horizontal section taken on the line 12—12 of Fig. 11.

Referring to the drawings, the device comprises a casing assembled to form a unit and comprising as the parts thereof, a receptacle 1 adapted to contain the material to be distributed. While the receptacle can be of any desired form, in the embodiment of the invention illustrated, this receptacle is shown as having an upper cylindrical portion, an intermediate portion 2 tapering downwardly therefrom and a lower substantially semi-cylindrical portion 3, the axis of said latter portion being substantially horizontal. A shaft 4 extends axially through the portion 3 and is journaled at one end in a flanged bushing 5 suitably secured by solder or other means to the side wall of the portion 3. The side walls of said portion 3 are formed with depressions 6 and 7 of general cylindrical shape extending concentric with the shaft 4. These depressions each have a groove extending upwardly therefrom, as illustrated in dotted lines in Fig. 3 and the depression 6 is adapted to receive a washer 8 of felt or similar material which is held in place by the bushing 5. The shaft 4 extends at its other end through a gear casing 9 of flat elongated shape which is secured to the side wall of a fan casing 10 disposed at the rear of the receptacle 1 from which fan casing a tapered conduit 11 extends forwardly beneath the lower portion 3 of the receptacle, which conduit terminates in a cylindrical or other discharge nozzle 12. The outer end of shaft 4 is formed as a crank 13 provided with a suitable operating handle 14. The bottom wall of the portion 3 of the receptacle is formed with a series of spaced parallel transverse slits 15 and at each end of each slit is a tongue 16 offset outwardly from the bottom wall of the portion 3 and integral therewith. These tongues 16 form the support and guiding means for a strip of material 17 which is also provided adjacent one end with a series of spaced transverse elongated slits 18. The strip 17 is thus held against the bottom wall of the portion 3 so that the slits 15 can aline with the slits 18. The strip 17 is adapted to be reciprocated to move said slits out of or into alinement for which purpose the strip has struck up therefrom somewhat adjacent the end opposite the slits 18, a pair of lips 19 forming between them a slot. A chamber is formed adjacent the front of the portion 3 of the receptacle by a wall 20 secured to the top of the conduit 11 at its lower end and having upwardly extending parallel side walls and bent at right angles into contact with the side of the portion 2 to form a top wall. A small crank member 21 has its end journaled in the wall 20 and has secured thereto inside of said wall a cup-shaped disk member 23 shown in detail in Figs. 11 and 12. This member has an eccentric flange 24 thereon and is connected to the crank 21, the flange 24 being disposed in the slot formed between the lugs 19 so that when the crank 21 is turned, the strip 17 will be reciprocated owing to the eccentric form of said flange 24. The strip 17 is guided and securely held in proper position by a flat U-shaped plate 22 secured to the inside of wall 20 and extended over the upper end of strip 17 and disk 23. The outer side of the wall 20 is formed with a series of circumferentially spaced graduations 25 suitably numbered from 1 to 6 and a small plate 26 projects downwardly and outwardly from said wall adapted to form a stop for the crank handle 21. The parts are so arranged that when the crank handle engages one side of said stop, as illustrated in Fig. 5, that the slits 18 will be out of alinement with the slits 15 so that no material can pass through the bottom of the portion 3 of the receptacle. This position is marked as the "Off" position on the wall 20.

Figure 1:
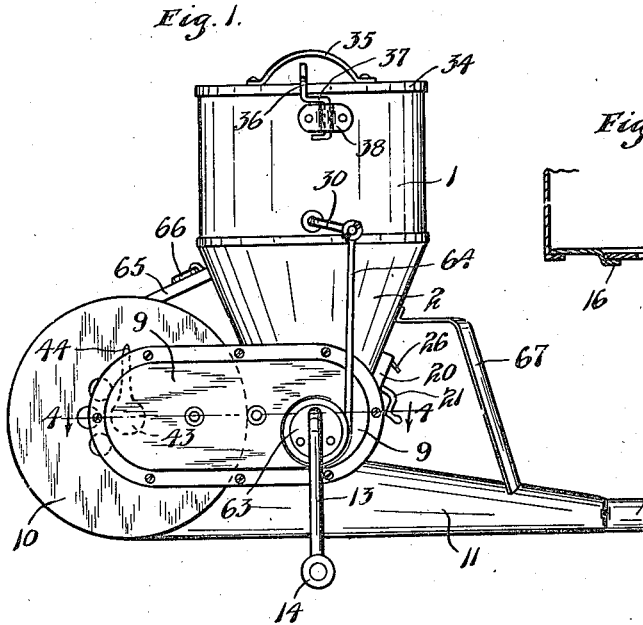
Figure 8:
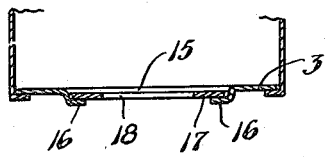
Fig. 8 is a vertical section taken on the line 8—8 of Fig. 3, as indicated by the arrows, Figs. 5 to 8 being shown on an enlarged scale.
Figure 9:
Fig. 9 is a view in plan elevation of an adjusting strip used.
Figure 2:
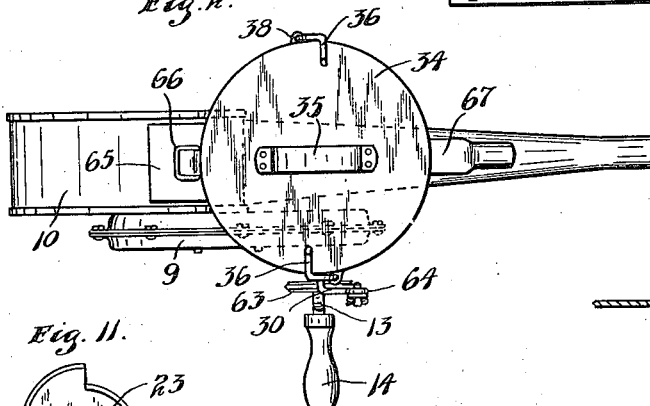
Fig. 2 is a top plan view thereof.
Figure 10:
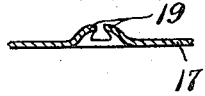
Fig. 10 is a vertical section taken on the line 10—10 of Fig. 9.

The shaft 4 has secured thereto an agitator 27 having a hub extending between the side walls of the portion 2 of the receptacle and secured to said shaft by a suitable set screw 28. The agitator comprises a disk disposed substantially in a vertical plane transversely centrally of the receptacle 3, which disk is substantially of square form. Said disk has extending from each side thereof and at the rear corners thereof, relatively to its direction of rotation, rectangular blades 29. These blades are bent angularly laterally adjacent said disk and have their terminal portions bent and disposed in planes substantially at right angles to the plane of said disk, said blades being disposed substantially centrally relatively to said disk. A small shaft or rod 30 extends transversely of the upper portion of the receptacle 1 above and parallel to the shaft 4 and has its outer end formed as a short crank, as shown in Fig. 1, said rod being journaled in the sides of said receptacle. Inside of the receptacle the rod is formed as or has secured thereto a bail member 31 having side portions converging downwardly in the portion 2 of the receptacle, which side portions are joined by an upwardly bent portion 32 extending over and in close proximity to the top of the blades 29 or agitator 27, the bail thus having somewhat pointed bends at each side extending slightly downwardly at each side of the blades 29. The rod 32 also has rigidly secured thereto a ring 33 of smaller diameter than the cylindrical portion of the receptacle 1.

The receptacle 1 is provided with a suitable flanged lid 34 fitting over the top thereof carrying a handle member 35. The said lid is held tightly in closed position by arms 36 bent to extend over the top of lid and having offset portions 37 pivotally mounted in clips 38 riveted or otherwise secured to the outer sides of the receptacle 1.

The fan casing 10 is substantially cylindrical in form and a shaft 40 extends axially therethrough having secured thereto a blade 41 of the fan, which blade is illustrated as a rectangular sheet of material bent to extend on both sides of said shaft. The side walls of the casing 10 are also formed with cylindrical depressions 42 and 43 concentric with shaft 40, which depressions have grooves 44 extending upwardly therefrom. A washer 45 of felt or similar material is disposed in the depression 42 and held therein by the flange of a flanged bushing 46, which flange is soldered or otherwise suitably secured to the outer side of said wall, said bushing having one or more small holes extending through the barrel portion thereof. The barrel portion of the bushing extends through the washer 45 and the side wall of the fan casing and forms the bearing for one end of the shaft 40. A washer 47 of felt or similar material is also disposed in the depression 43 and a bushing 48 extends through said washer and the wall of the fan casing having its inner end substantially flush with the inside of said casing. The washer 43 is held in place by the side of the gear casing 9, which is disposed in contact with the wall of the fan casing. The bushing 48 has a flange disposed on the inside of the wall of the gear casing 9 and this bushing forms the bearing in the other end of shaft 40. A pinion 49 is disposed on the shaft 40 in contact with the outer side of the bushing 48 and is secured to said shaft by a cotter pin 50 extending through a slot therein and through said shaft. The end of shaft 40 abuts against the outer side of the casing 9 and said shaft is thus held from longitudinal movement in one direction by said casing. The pinion 49 meshes with a gear 51 secured to the hub of a pinion 52. This pinion is journaled on a shaft 53 secured in the sides of the gear casing 9. Said shaft 53 has a reduced portion at one end extending through and riveted into a small depression 54 formed in one side of the casing 9 and has a reduced end extending through an aperture in a similar depression 55 in the opposite wall of casing 9. The pinion 52 meshes with another gear 56 which is rigidly secured to the hub of a pinion 57 carried on a shaft or stud 58 secured in the sides of casing 9 in the same manner as is the shaft 53. The pinion 57 in turn meshes with a gear 59 riveted or otherwise suitably secured to a sleeve 60 which is journaled in a bushing 61 having a flange secured on the inside of casing 9 and extending through an aperture therein. Said sleeve 60 is secured to the shaft 4 by a suitable cotter pin 62 extending therethrough and through said shaft. A sleeve of felt 68 or similar material surrounds the shaft 4 between the casing 9 and the portion 3 of the casing and has one end pressed into and disposed in the depression 7 of said portion 3.

The shaft 4 has a grooved disk 63 thereon eccentrically secured thereto and a rod 64 of a diameter to be received in said groove extends substantially entirely around said disk. The rod 64 extends upwardly at one side of said disk and is pivotally connected at its upper end to the end of crank rod 30, as clearly shown in Fig. 1.

The gear casing 9 as clearly shown in Fig. 4 is made of two similar flange sections secured together by headed and nutted bolts so that the same can readily be disassembled. The fan casing 10 has a plurality of openings adjacent the center thereof forming the customary air opening for the fan. A brace 65 extends between the fan casing 10 and the portion 2 of the receptacle and has pivoted therein a loop 66 to which may be attached a strap by which the duster may be carried. Another bracket 67 is secured to the opposite side of the receptacle 1 and extends outwardly therefrom and then downwardly at an angle to the conduit 11. The supporting strap may be fastened under the top of the bracket 67 if desired.

In operation, the material to be distributed will be placed in the receptacle 1. This material will be in the form of a powder such as can be effectively blown and distributed or scattered by an air blast. After the receptacle 1 has been filled, the lid 34 will be placed thereon and locked in position by the arms 36. The device can be lifted by the handle 35 with the lid so locked and preferably a supporting strap connected as described to the members 66 and 67 will be used which can be placed over the shoulder of the operator. The crank 21 will now be turned to give the desired opening through the slits 15 and 18 in the bottom of the receptacle 3. The device will then be in position for operation and will be carried along and disposed adjacent the articles to be dusted. The crank 13 will be turned by the handle 14 and the fan 41 will be rotated at high speed through the gears disposed in the casing 9. As the crank is turned, the agitator 27 will be rotated to keep the material loosened in the lower portion 3 of the receptacle and to insure that the same will pass through the bottom thereof. The form of said agitator is of particular importance. By disposing the blades 29 in a plane at right angles to the disk 27, it will be noted that as the agitator turns in a clockwise direction, the outer flat side of said blades as the same approach the bottom of the portion 3 of the receptacle tend to push the material downwardly and thru the slits 15, thus insuring that the material will pass therethrough into the conduit 11. The agitator therefore not only serves to loosen up material to prevent the same becoming packed but acts to feed the material through the bottom of the portion 3. As the shaft 4 is revolved the disk 63 will revolve and the rod 64 will be reciprocated, since the same acts as an eccentric strap so that the rod 30 will be oscillated. The oscillation of rod 30 will oscillate the bail 31 which will thus move back and forth through the material and keep the same loose so as to insure that the material will pass freely to the agitator 27. It will be noted, as described, that the lower portions of the bail 31 come in close proximity to the edges of the blades 29 and extend slightly downward at each side thereof so that any material tending to stick to said blades will be freed therefrom. Some of the powders used for spraying, such as arsenate of lead, are somewhat sticky and inclined to become compacted. The action of the members 27 and 31 will act efficiently to keep such powders loosened up and feeding in proper shape. As the bail 31 is oscillated the ring 33 will also be oscillated in a substantially vertical plane so that the material will be kept loosened and moving downward in the receptacle. As the material moves into the conduit 31 the same is encountered by the air blast from the fan 41 which is revolved in the direction indicated by the arrows in Fig. 3. The blast passes out through the conduit 11, as indicated by the arrows in said figure and the powder fed into the conduit will be discharged from nozzle 12 in a finely divided shower so that the same will be evenly distributed on the desired objects. The provision of the depressions 6, 7 and 42 and 43 with the grooves leading therefrom form a simple and convenient means for lubricating the device at the necessary points. The nozzle of the oil can is placed in the groove and the oil then runs down the groove into the depression and into contact with the felt washer placed in said depression. The oil is thus transferred by the felt washer to the rotating parts either directly or through the holes in the bushings 46 and 48. The felt washers also act to exclude dust from the interior of the casing and the flanged bushings 8, 46 and 61 which have their flanges soldered or otherwise intimately connected with the casing form a perfectly tight closure. The parts are arranged to be very compact and so that a minimum of parts will be required. The strip 17 and disk 23 are easily made from sheet metal and are arranged to form a simple and efficient adjusting means. The device being formed principally of light sheet metal is quite light in weight and yet the parts are so arranged and connected that a very rugged and durable device is provided.

The device has been amply demonstrated in actual practice and found to be very efficient and successful and the same is now being commercially made and sold.

It will, of course, be understood that various changes may be made in the form, details, arrangement and proportions of the parts without departing from the scope of applicant's invention, which, generally stated, consists in a device capable of carrying out the objects above stated and such as shown and described and set forth in the appended claims.

What is claimed is:

1. A dusting device having in combination, a receptacle for holding the material to be distributed, a revoluble agitator in said receptacle mounted to rotate on a horizontal axis, an oscillating bail mounted on a horizontal axis above said agitator and adapted to swing across the top of said agitator, and means for revolving said agitator and for swinging said bail across the same.

2. A dusting device having in combination, a receptacle for holding the material to be distributed, a revoluble agitator in said receptacle mounted to rotate on a horizontal axis, an oscillating bail mounted on a horizontal axis above said agitator, means for operating said agitator and bail, said bail having a portion extending transversely above said agitator and closely adjacent the same, and portions extending downwardly slightly at each side of said agitator.

3. A dusting device having in combination, a receptacle for holding the material to be distributed, a revoluble agitator in said receptacle mounted to rotate on a horizontal axis, an oscillating bail mounted on a horizontal axis above said agitator, means for operating said agitator and bail, and an annular agitator disposed in a plane substantially perpendicular to the plane of said bail adjacent the top of and movable with said bail.

4. A dusting device having in combination, a receptacle for holding the material to be distributed, a revoluble agitator in the lower portion thereof, a horizontal shaft on which said agitator is mounted projecting at one side of said receptacle, a shaft extending across said receptacle above said shaft and having a crank portion at its end, a depending bail mounted on said latter shaft and oscillatable across the top of said agitator, means for simultaneously operating said agitator and bail comprising a crank on said first mentioned shaft, an eccentric on said first mentioned shaft, and an eccentric sleeve on said eccentric connected to the crank portion of said second mentioned shaft.

5. A dusting apparatus having in combination, a receptacle having a lower substantially semi-cylindrical portion, an agitator therein being formed as a disk disposed in a substantially vertical plane, and having substantially radially projecting blades having their ends bent into planes substantially normal to the plane of said disk, and means for rotating said agitator.

6. The structure set forth in claim 5, said semi-cylindrical portion of said receptacle having a series of adjacent slots in its bottom extending longitudinally thereof and the said agitating blades being disposed so that the edges of said blades are parallel to said slots and move in close proximity thereto.

7. In a dusting apparatus, the combination with a receptacle having a lower substantially semi-cylindrical portion having a horizontal axis and having an apertured bottom, of a shaft extending axially through said portion, a rotatable agitator centrally mounted on said shaft comprising a substantially square disk disposed in a substantially vertical plane and having rectangular blades projecting from the rear corners thereof, said blades having their terminals bent into planes at right angles to the plane of said disk and disposed substantially centrally transversely thereof, said blades being arranged to move in close proximity to the wall of said semi-cylindrical portion of the receptacle whereby a pushing action is given the material as said blades approach their lowest position.

8. The structure set forth in claim 7, a shaft extending centrally of said receptacle above said shaft and parallel thereto, an oscillating depending bail member having its free end secured to said latter shaft and having a portion extending across and downward at each side of the terminal portion of said blades and closely adjacent thereto.

9. The combination with a receptacle, of an agitator therein comprising an annular portion disposed substantially in a plane at right angles to the vertical axis of said receptacle and oscillatable about a diametrical axis in said plane and having a bail depending from its sides and disposed in a plane substantially at right angles to said plane.

In testimony whereof I affix my signature.

H. E. BRANDT.